United States Patent [19]
Smith, Jr.

[11] Patent Number: 5,097,749
[45] Date of Patent: Mar. 24, 1992

[54] ROLLING RAMP INLET

[75] Inventor: William M. Smith, Jr., Corunna, Ind.

[73] Assignee: CTB, Inc., Milford, Ind.

[21] Appl. No.: 622,850

[22] Filed: Dec. 6, 1990

[51] Int. Cl.$^5$ .............................. F24F 13/06; F24F 7/02
[52] U.S. Cl. ................................. 454/251; 454/260; 454/273
[58] Field of Search ............... 98/33.1, 41.2, 42.09, 98/40.11, 40.15, 40.16, 110, 42.2; 119/16

[56] References Cited

U.S. PATENT DOCUMENTS

| | | | |
|---|---|---|---|
| 3,213,776 | 10/1965 | Adams | 98/42.2 |
| 3,350,819 | 11/1967 | Polidoro et al. | 98/41.2 |
| 3,601,096 | 8/1971 | Rutherford | 98/33.1 |
| 3,741,102 | 6/1973 | Kaiser | 98/110 |
| 3,812,772 | 5/1974 | Kaiser | 98/110 |
| 3,830,146 | 8/1974 | Kaiser | 98/41 SV |
| 4,241,871 | 12/1980 | Newell, III et al. | 98/33.1 |
| 4,334,577 | 6/1982 | George | 98/33.1 |
| 4,671,350 | 6/1987 | Toukola | 98/33.1 |

*Primary Examiner*—Albert J. Makay
*Assistant Examiner*—William C. Doerrler
*Attorney, Agent, or Firm*—Trexler, Bushnell, Giangiorgi & Blackstone

[57] ABSTRACT

A ventilation control apparatus for use with a building ventilation system in a building. The building ventilation system including input and outlet vents and a fan. An opening is formed in the ceiling of the building for introducing ventilating air flow into the building from the input vent through the opening and out through the outlet vent. The ventilation control apparatus includes a movable baffle and may have a baffle counterbalance attached to the movable baffle. The movable baffle is positioned under the opening for regulating air flow through the top channel into the building. The counterbalance, if used, is attached to the movable baffle and weighted for closing the movable baffle a desired distance relative to the top channel when the fan is not operating and for controllably regulating movement of the movable baffle relative to the top channel when the fan is activated to create a pressure drop across the top channel. The pressure drop creates a force which moves the movable baffle member. The movement of the baffle member lowers the pressure drop and is hence self adjusting. The baffle will move to the position appropriate to the amount of air flowing. Adding weight to the counterbalance will increase the pressure drop.

21 Claims, 3 Drawing Sheets

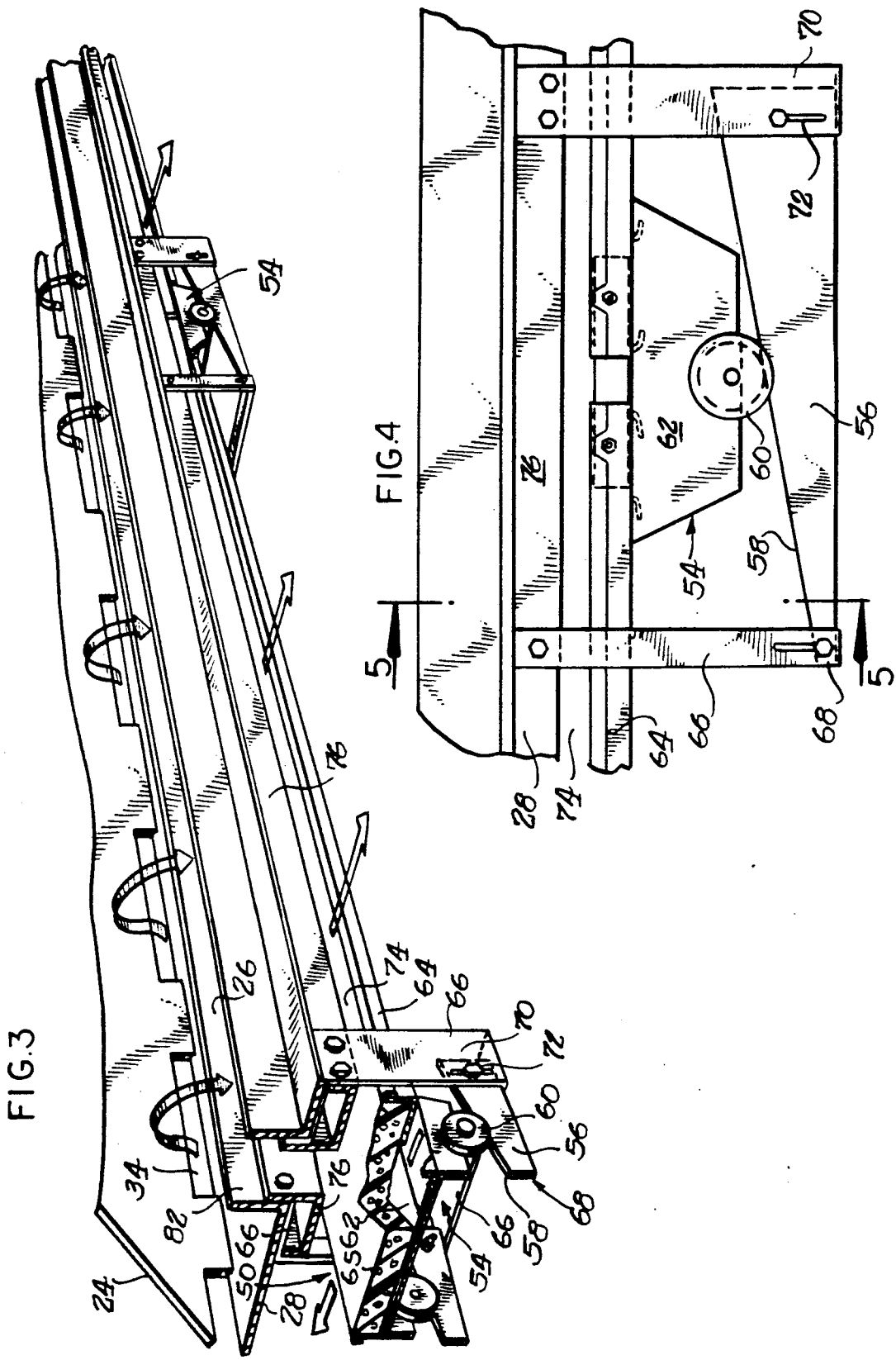

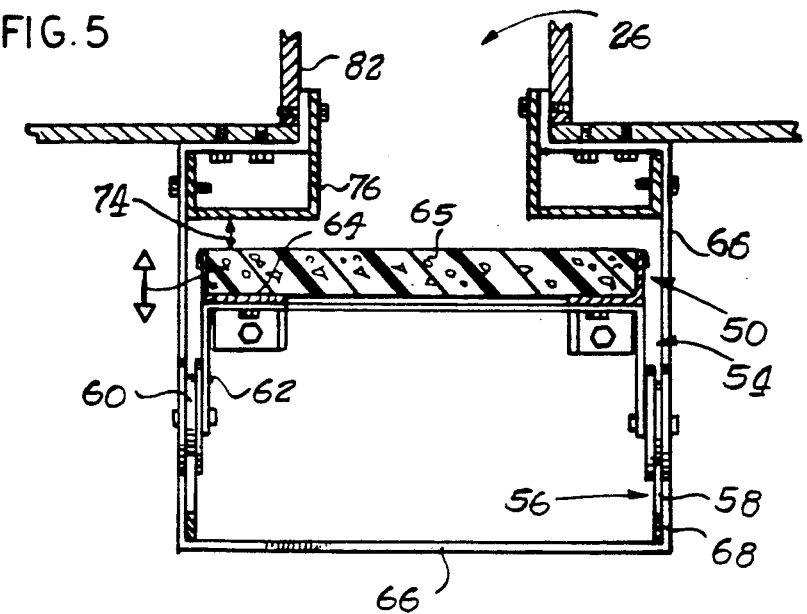
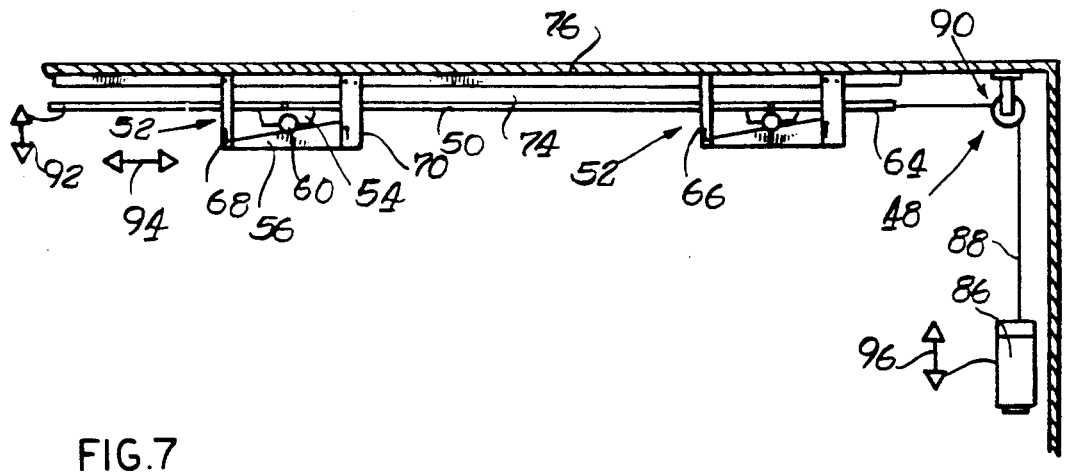
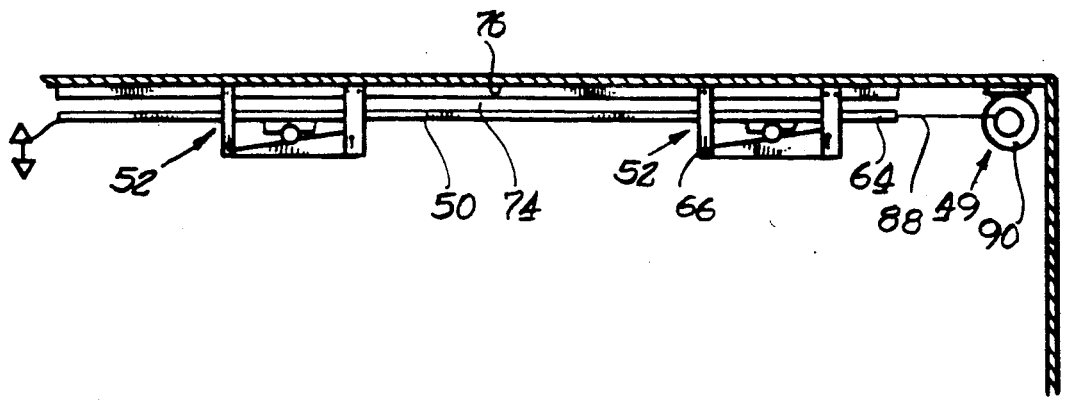

ROLLING RAMP INLET

BACKGROUND OF THE INVENTION

This invention relates to a ventilation control apparatus for use with a building ventilation system in a building.

Current livestock ventilation systems have many inadequacies primarily due to the fact that such ventilation systems merely draw a ventilating air flow through the building. Attempts to control the air flow have included regulating the speed of fans employed to induce an air flow as well as employing complex electromechanical vents to regulate the air flow. Such control devices are undesirable in some circumstances due to the complexity of regulating such control devices.

For example, regulating the air flow employing only fans lacks the ability to direct air flow in specific directions through a facility or to control the velocity of the air flow coming through an uncontrolled aperture. Mechanical vents were employed to regulate the direction and velocity of the air flow, however, controlling the velocity of the air flow resulted in changing the direction due to the mechanical characteristics of such prior art vents.

Regulation of livestock ventilation is an important factor in raising livestock in a healthy and efficient manner. For example, in a poultry building it is important to ventilate all of the poultry cages to extract the dust and the odor and substance of the poultry manure as well as provide fresh respiratory air. This is also very important for the health of people working in the building. While it is important to provide cooling air, it is also important to avoid dramatic temperature changes which may cause temperature shock or stress to the poultry or other livestock. Therefore, as well as controlling the velocity and direction, it is important to facilitate the mixing of cooler intake air with that of existing ambient air.

Further, many prior art systems are inefficient in that they require a sufficient amount of energy to create a substantial pressure differential to induce air flow through the building. For example, conventional ventilation systems require a pressure differential of .07 inches of water in order to achieve sufficient turbulence, volume and mixing of the air in the building. The requirement to create such a pressure differential imposes requirements on fans and hence electrical demand in order to achieve this pressure differential. The demand for energy for ventilation results in additional costs to the livestock producer.

Since efficiency in livestock production is extremely important, it is desirable to produce a system which is uncomplicated including minimal electromechanical components, simplification of the essential components, and reduction in operation expenses.

OBJECTS AND SUMMARY OF THE INVENTION

A general object of the present invention is to provide a ventilation control apparatus which provides simplified yet efficient directional, volume and temperature regulation of ventilation air flow.

Another object of the present invention is to provide a ventilation control apparatus which is regulated by air flow inducing fans without the need for complex monitoring of the ventilation control apparatus.

Yet a further object of the present invention is to provide a ventilation control apparatus which is counterbalanced and attached and movable on a friction reducing device to promote movement of the ventilation control apparatus under the influence of air flow thereacross.

Still a further object of the present invention is to provide a ventilation control apparatus which directs air flow passing therethrough generally perpendicular thereto to provide directional control as well as thorough ventilation and temperature equalization of the air flow.

Another object of the present invention is to provide a novel structure capable of adjusting the effective size of an air passageway for evenly distributing air while maintaining substantially a predetermined minimum pressure differential for enhancing the efficiency of the system.

Briefly, and in accordance with the foregoing, the present invention comprises a ventilation control apparatus for use with a building ventilation system in a building. The building ventilation system including input and outlet vents and a fan. A long, narrow continuous opening is formed in the ceiling of the building for introducing ventilating air flow into the building from the input vent through this opening and out through the outlet vent. The ventilation control apparatus includes a movable baffle and can use a baffle counterbalance attached to the movable baffle. The movable baffle is positioned under the long, narrow opening for regulating air flow through the opening into the building. If used, the counterbalance is attached to the movable baffle and weighted for closing the movable baffle relative to the opening when the fan is not operating and for controllably regulating movement of the movable baffle relative to the opening when the fan or fans are activated to create a pressure drop across the ventilation control apparatus which equalizes the air flow through the apparatus and creates the desirable air flow pattern shown in FIG. 2.

BRIEF DESCRIPTION OF THE DRAWINGS

The features of the present invention which are believed to be novel are set forth with particularity in the appended claims. The organization and manner of the operation of the invention, together with the further objects and advantages thereof, may be understood best by reference to the following description taken in connection with the accompanying drawings wherein like reference numerals identify like elements in which:

FIG. 3 is an enlarged partial fragmentary perspective view of the movable baffle means of the ventilation control apparatus and the first chamber indicating air flow through input vents to the top channel and out therethrough across a generally planar baffle member of the movable baffle means;

FIG. 4 is an enlarged partial fragmentary side view of a friction reducing device including a carriage member and a cooperatively formed angled ramp which facilitates movement of the generally planar baffle member towards and away from the top channel formed through the ceiling;

FIG. 5 is a cross-sectional view of the ventilation control apparatus taken along 5—5 in FIG. 4;

FIG. 6 is an enlarged partial fragmentary side view of the ventilation control apparatus showing movable baffle means with a counterbalance attached thereto positioned away from the top channel formed through the ceiling; and FIG. 7 is an enlarged partial fragmentary side view of the ventilation control apparatus showing movable baffle means with a baffle moving device attached thereto positioned away from the top channel formed through the ceiling.

DESCRIPTION OF THE ILLUSTRATED EMBODIMENT

Figure 1:
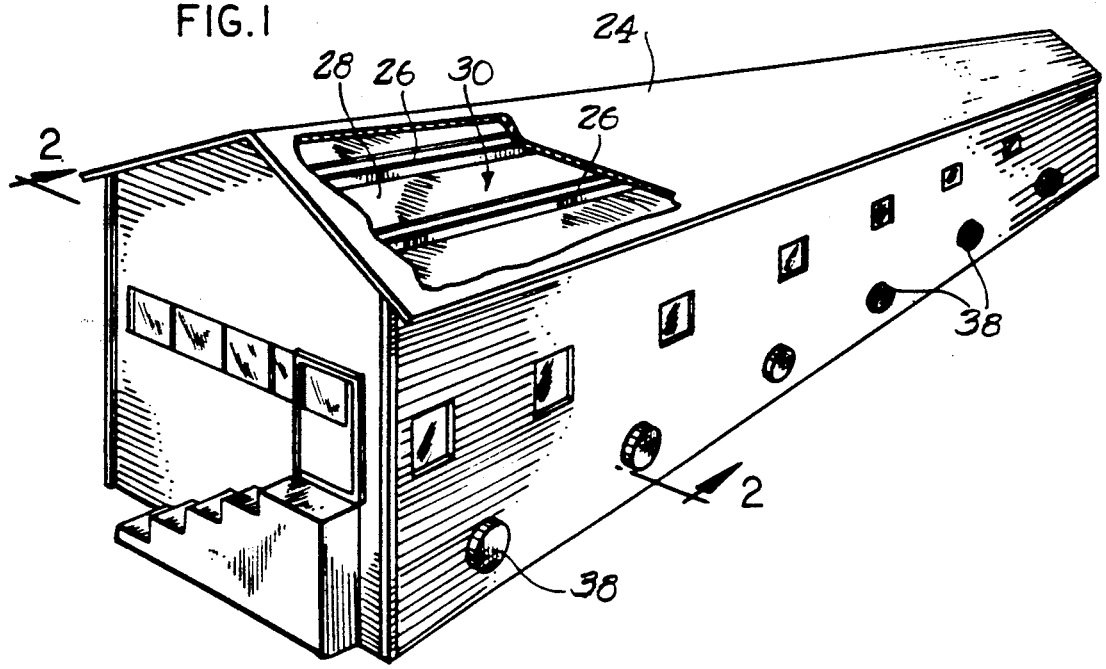
FIG. 1 is a partial fragmentary view of a livestock house in which a roof portion has been removed to illustrate top channels formed through a ceiling to permit air flow to pass from a first chamber or attic into a second chamber or living space, and outlet vents along the ground level thereof.

While this invention may be susceptible to embodiment in different forms, there is shown in the drawings and will be described herein in detail, a specific embodiment with the understanding that the present disclosure is to be considered an exemplification of the principles of the invention and is not intended to limit the invention to that as illustrated.

Figure 2:
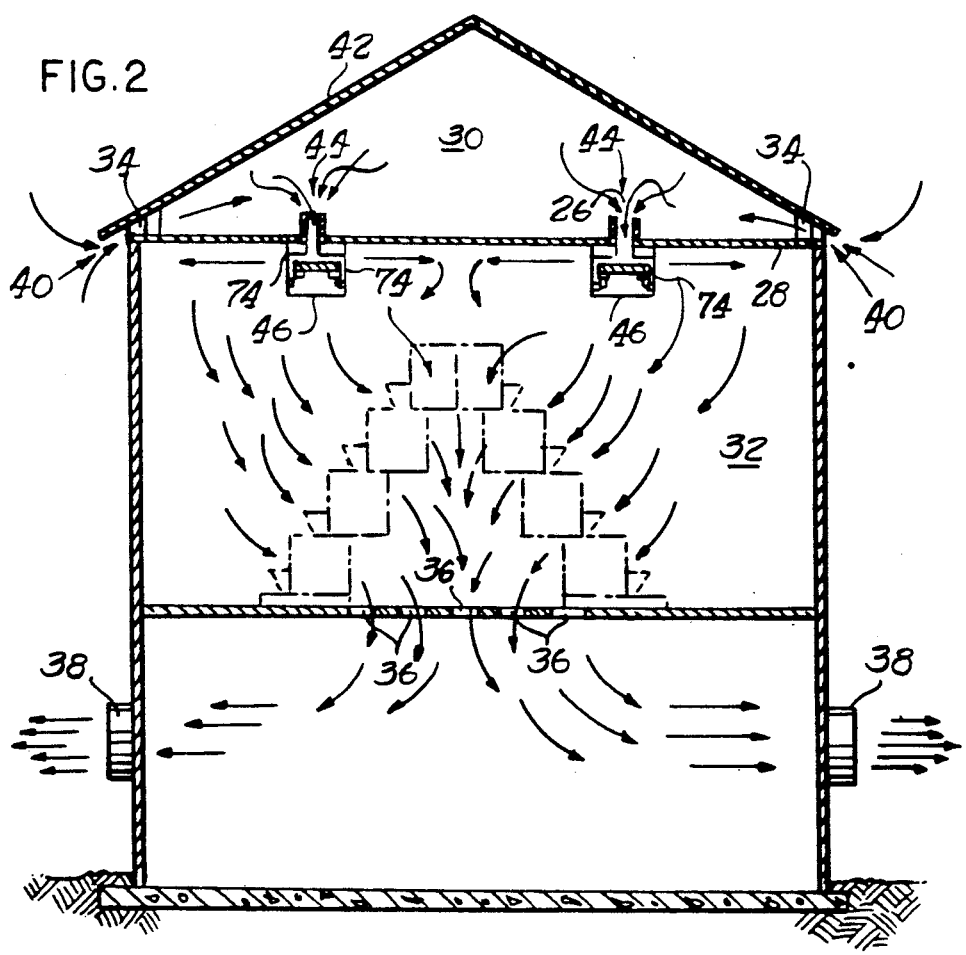
FIG. 2 is a cross-sectional view taken along 2—2 in FIG. 1 illustrating the air flow path into and through the first chamber into and through the second chamber and out through the outlet fans.

FIG. 1 shows a building 20 which is used for housing livestock. A portion of a roof section 24 has been removed to show openings 26 formed through a ceiling 28 which divides a first chamber 30 from a second chamber 32 (shown in FIG. 2) therebelow. With supporting reference to FIG. 2, the building 20 is provided with input vents 34, outlet vents 36 and fan means 38. The input vents 34 are formed to permit air to enter the first chamber 30 and are formed under roof soffits 40 as shown in FIG. 2. However, such input vents 34 could be provided in a top surface 42 to introduce air into the first chamber 30. Regardless of the position of the input vents 34, such vents 34 are provided in a protected manner to prevent the introduction of rain water and the like and to introduce air into the first chamber 30.

The outlet vents 36 are formed in the floor of chamber 32. Air is removed from the second chamber 32 through the outlet vents 36 under the influence of fan means 38. Removal of air from the second chamber 32 creates a pressure differential or pressure drop between the first chamber 30 and the second chamber 32 thus inducing air flow through the opening 26 formed therebetween. Therefore, the air flow follows a circuit of: introduction of air through input vents 34 into the first chamber 30; passage from said first chamber 30 to said second chamber 32 through the top openings 26; air moving through the opening 26 into the second chamber 32 is removed from the second chamber 32 through the outlet vents 36 under the influence of the fan means 38.

A ventilation control apparatus 44 attached to the ceiling 28 covering the opening 26 provides precise control of the volume of air flowing through the opening 26 as well as directs the direction of the air flowing out of the opening 26. The ventilation control apparatus 44 includes movable baffle means 46 for regulating the air flow through the opening 26 and, if used, a baffle counterbalance means 48 operatively attached to the baffle means 46 for positioning the baffle means 46 at a desired distance relative to the opening 26.

FIG. 3 provides an enlarged partial fragmentary perspective view of the movable baffle means 46 of the ventilation control apparatus 44. As shown, the movable baffle means 46 includes a generally planar baffle member 50 and friction reducing means 52. The friction reducing means 52 operatively positions the baffle member 50 relative to the opening 26. The friction reducing means 52 include carriage means 54 onto which said baffle member 50 is attached and supported thereby and a cooperatively formed ramp members 56 positioned underneath and supporting the carriage means 54. Two sloped surfaces 58 are formed on the ramp members 56 for operative engagement with a pair of wheels 60 of the carriage means 54. The wheels 60 are rotatably attached to a platform 62 to which the generally planar baffle member 50 is attached.

Elongate baffle supporting members or supporting members 64 extend between spaced apart carriage means 54 and connect to the carriage means 54. The supporting members 64 provide support to prevent vertical sagging of the planar baffle member 50 positioned between the spaced apart carriage means 54. The platform 62 and side rail members or support members 64 are generally parallel rigid non-elastic members and a panel member 65 is retained therebetween a generally rigid member formed of a light weight material such as rigid closed cell foam. The support members 64 transmit forces through the movable baffle member 50 without stretching which is associated with cable arrangements.

With reference to FIG. 4, the ramp member 56 is suspended below the opening 26 by ramp support member 66 extend downwardly from the ceiling 28 and attach to the ramp member 56 at a narrow end 68 and a wide end 70. The ramp support members 66 are slotted to allow vertical adjustability of the ramp member 56. This compensates for inaccuracy in the horizontal positioning of the ramp support members 66 which result in vertical variations that are offset by this adjustability feature. The ramp support member 66 also limits the maximum range of movement of the carriage means 54 along the ramp member 56 since a portion of the wheel 60 hangs over the sloped surface 58 and is stopped by the ramp support member 66 at either end of the range.

As the carriage means 54 rolls on the wheels 60 along the sloped surfaces 58 towards the narrow ends 68 of the ramps 56, the baffle member 50 moves away from the ceiling 28 opening side channels 74. As the carriage means 54 rolls upwardly along the ramp members 56 the side channels 74 narrow until the side channels 74 are closed.

FIG. 5 provides a cross-sectional view of the ventilation control apparatus taken along line 5—5 in FIG. 4 and further illustrating opening leveling members 76. In a building such as a poultry facility which may extend several hundred feet in length, it is important to assure that the baffle member 50 closes against the opening 26 in order to provide maximum ventilation control. In a structure which uses a ventilation control system extending several hundred feet in length, the ceiling 28 is generally not uniform and therefore must be leveled in order to provide adequate control of the air opening. The ramp support member 66 is fastened to an edge 82 of the opening 26 and to the ceiling 28. The leveling members 76 attached to the ramp support member 66 promote predictable construction of the top channel 26 for engagement by the baffle member 50.

As shown in FIG. 6, a series of baffle member sections 50 are attached to spaced apart friction reducing means 52 to permit regulation of the opening 26 which extends generally perpendicularly thereto. Baffle counterbalance means 48 includes a counterbalance weight 86 attached to the movable baffle means 46 by attachment means 88 and operatively engaged with force directing means 90. The attachment means 88 is attached to the supporting member 64 on either side of the baffle member 50 and extends through the force directing means or pulley 90, as illustrated in FIG. 6, and attaches to a counterbalance weight 86.

The ventilation control apparatus 44 as described in FIGS. 1-5 is shown in FIG. 6 and further illustrates the baffle counterbalance means 48. As shown, a series of baffle member sections 50 are attached to spaced apart friction reducing means 52 to permit regulation of the opening 26 which extends generally perpendicularly thereto. Baffle counterbalance means 48 includes a counterbalance weight of 86 attached to the movable baffle means 46 by attachment means 88 and operatively engaged with force directing means 90. The attachment means 88 is attached to the supporting member 64 on either side of the baffle member 50 extends through the force directing means or pulley 90, as illustrated in FIG. 6, and attaches to a counterbalance weight 86.

The counterbalance weight 86 is first weighted to offset the dead weight of the baffle member 50, supporting members 64 and carriage means 54. Air flow through the opening 26 induced by the pressure differential created between the first and second chambers 30, 32 when fans are running provides additional force downward on the baffle member to move the movable baffle means 46. Adding to the counterweight will define this pressure drop. As more or less fans run, the movable baffle will move until the pressure drop adjusts to offset the added counterweight. This results in a truly self adjusting inlet system that needs no electromechanical devices to control it. The force directing means 90 translates combined vertical and horizontal movement (as indicated by arrows 92 and 94, respectively) effecting the portion of the attachment means 88 attached to the movable baffle means 46 in a generally horizontal direction 94 and translates such force into a generally vertical movement 96 of the portion of the attachment means 88 attached to the counterbalance weight 86.

As shown in FIG. 7, the baffle moving device 49 is attached to a surface of the facility in a stationary position. The attachment means 88 is attached to the supporting member 64 and extends through the force directing means or pulley 90 attached to the baffle moving device or winch 49. The winch 49 controllably retracts or releases the attaching means 88 to controllably position the baffle member 50 relative to the top channel 26. When the attachment means 88 is retracted by the winch 49 the baffle member 50 is positioned covering the top channel 26. When a sensing device, such as a barometric pressure sensor, detects a predetermined change in the internal pressure of the facility, the winch 49 is activated to release the attachment means 88 and permit the baffle member 50 to move downwardly away from the top channel 26. Upon equalization of the barometric pressure in the facility, the winch 49 sets a brake to limit the movement of the movable baffle means 46 relative to the top channel 26.

In use, activation of the fan means 38 creates a pressure differential between the first and second chambers 30, 32 sufficient to move the movable baffle means 46 to create an air flow through the top channel 26. Air flow through the top channel 26 is directed outwardly though the side channels 74 generally parallel to the ceiling 28. Passage of the air flow generally parallel to the ceiling 28 promotes mixing of the introduced air with the existing ambient air near the ceiling 28 in the second chamber 32. This mixing equalizes the temperature thereby reducing the temperature differentiation of the newly introduced air. Further, generally parallel movement of the air along the ceiling 28 and subsequent generally perpendicular impact with the vertical walls, and with the air coming from a second inlet, if used, makes the air more turbulent increasing the ventilation effect and assuring that the air volume in the second chamber 32 is substantially replaced by the air flow. The rate of operation of the fan means 38 may be used to control the movable baffle means 46 such that an increase in the fan speed results in increasing the side channels 74 and increasing the air flow therethrough. The counterweight approach does this automatically. More complex electromechanical systems can accomplish the same air flow results.

While a preferred embodiment of the present invention is shown and described, it is envisioned that those skilled in the art may devise modifications of the present invention without departing from the spirit and the scope of the appended claims.

I claim:

1. A ventilation control apparatus for use with a building ventilation system in a building; said building ventilation system including input and outlet vents and fan means for moving air therethrough, an opening formed in a ceiling of said building for introducing ventilating air flow into said building from said input vent through said opening and out through said outlet vent; said ventilation control apparatus comprising movable baffle for regulating air flow through said opening, a guidance structure for guiding said baffle in movement having horizontal and vertical components relative to said opening, said guidance structure including a first member connected to said baffle and a second member attached to said building, one of said first and second members providing a ramp, and baffle counterbalance means operatively attached to said baffle and weighted for closing said baffle relative to said opening when said fan means are not operating and for controllably regulating movement of said baffle relative to said opening when said fan means are activated to create a pressure differential across said ventilation apparatus.

2. A ventilation control apparatus according to claim 1, wherein said baffle comprises a generally planar baffle member positioned generally parallel to said ceiling of said building and positioned covering said opening formed therethrough.

3. A ventilation control apparatus according to claim 2, in which said generally planar baffle member moves generally perpendicular to said ceiling to controllably cover said opening formed therethrough for regulating and directing the air flow moving therethrough.

4. A ventilation control apparatus according to claim 3, wherein said baffle includes a generally planar baffle member operatively positioned generally parallel to said ceiling of said building, said baffle member directing the air flow moving through said opening generally parallel to said ceiling.

5. A ventilation control apparatus according to claim 2, wherein said guidance structure comprises wheels and cooperatively formed ramp members supporting said baffle member, said ramp members being spaced away from said ceiling to provide sufficient distance for movement of said baffle member thereon, said baffle member being movable relative to said ramp members to move said baffle member towards and away from said opening under the influence of air flowing through said opening created by a pressure differential.

6. A ventilation control apparatus according to claim 5, further including said ramp members being adjustably attached to said ceiling for adjusting the vertical position of said ramp member.

7. A ventilation control apparatus according to claim 1, wherein said counter balance means comprises: a counterbalance weight attached to said movable balance means for counteracting the collective weight of said baffle member and carriage means plus the effect of the pressure caused by the air flow; attachment means for attaching said counterbalance weight to said baffle member a distance away from said baffle member; and force directing means for directing a generally vertical force created by said counterbalance weight to create a horizontal movement of said baffle member along said ramp members.

8. A ventilation control apparatus according to claim 7, wherein said attachment means is a cable and said force directing means is a pulley.

9. A ventilation control apparatus for use in a livestock building ventilation system: said building ventilation system including input and outlet vents and fan means for inducing air flow therethrough, a first chamber formed with said input vents therethrough in communication with a second chamber with said outlet vents formed therethrough, a ceiling formed between said first and second chambers, an opening formed through said ceiling to permit air flow from said input vents through said first and second chambers out through said outlet vents; said ventilation control apparatus comprising movable baffle means for regulating air flow through said opening having counterbalance means attached thereto for counterbalancing a cumulative mass of said baffle means and the effect of the pressure from air flow; opening leveling members connected to said ceiling along said opening forming a generally linearly consistent opening surface; said movable baffle means comprising a generally planar baffle member attached to a carriage means for supporting said baffle member attached thereto proximate to said top channel and angled ramp members adjustably attached to said mounting member and positioned under said carriage means; said baffle counter balance means comprising a counterbalance weight attached to said baffle member for creating a force for moving said baffle member attached to said carriage member upwardly along said ramp members towards said top channel, attachment means for spacing said counterbalance weight a distance away from said baffle member, said attachment means being attached at a first end to said baffle member and attached at a second end to said counterbalance weight, and force directing means for transferring a generally vertical force created by said counterbalance weight into a generally horizontal force for moving said baffle member and said attached carriage member along said ramp members, said force directing means being positioned between said counterbalance weight and said baffle member, said baffle member being in a generally consistent abutting contact with said top channel when no air flow is passing through said top channel.

10. A ventilation control apparatus according to claim 9, wherein ramp support members are adjustably attached to said ramp members for adjustably suspending said ramp member spaced away from said top channel to accommodate said baffle member and attached carriage member.

11. A ventilation control apparatus in combination with a building structure; said building structure including a first chamber and a second chamber separated by a ceiling, air flow input vents formed in said first chamber and outlet vents formed in said second chamber, an opening formed in said ceiling for providing an air flow path between said first chamber and said second chamber, fan means positioned proximate to one of said input and outlet vents for creating a pressure differential between said first and said second chambers for inducing air flow through said input vent into said first chamber through said opening and into said second chamber and out through said outlet vent; said ventilation control apparatus comprising movable baffle means for regulating air flow through said opening of said building and a baffle moving device for positioning said movable baffle means a desired distance relative to said opening; said movable baffle means including a generally planar baffle member operatively positioned covering said opening and overlapping said ceiling for directing air flow through said opening generally parallel to said ceiling, a ramp member positioned proximate said opening, a carriage operatively associated with said ramp member, one of said ramp member and said carriage being attached to said baffle means for operatively positioning said baffle member relative to said opening, said planar baffle member being movable relative to said opening for varying the width of side channels formed between said planar baffle member and said ceiling; said baffle moving device including baffle counterbalance means weighted and attached to said baffle means for inducing movement of said planar baffle member and carriage along said ramp member upwardly towards said ceiling, said fan means creating a pressure differential between said first and second chambers inducing air flow through said opening overcoming said baffle counterbalance means for separating said baffle member from said top channel to promote air flow therethrough.

12. A ventilation control apparatus for use with a building ventilation system in a building; said building ventilation system including input and outlet vents and fan means for moving air therethrough and a channel formed in a partition of said building for introducing ventilating air flow into said building from said input vent through said channel and out through said outlet vent; said ventilation control apparatus comprising a movable baffle for regulating air flow through said channel of said building, a ramp member positioned proximate said opening, a carriage attached to said baffle operatively associated with said ramp member for movably positioning said baffle relative to said channel and a baffle counterbalance operatively attached to said movable baffle and weighted for closing said movable baffle when said means for moving air are not operating and for controllably regulating movement of said movable baffle relative to said channel when said fan means is activated to create a pressure differential across the ventilation control apparatus which will equalize the distribution of air into the building.

13. A ventilation control apparatus according to claim 12, wherein said movable baffle comprises a generally planar baffle member positioned generally parallel to said partition of said building and positioned covering said channel formed therethrough and said movable carriage attached to said generally planar baffle member for operatively positioning said baffle member relative to said channel.

14. A ventilation control apparatus according to claim 12, in which said generally planar baffle member moves generally perpendicular to said partition to controllably cover said channel formed therethrough for regulating and directing the air flow moving therethrough.

15. A ventilation control apparatus according to claim 14, wherein said movable baffle includes a generally planar baffle member operatively positioned generally parallel to said partition of said building, said baffle directing the air flow moving through said channel generally parallel to said partition.

16. A ventilation control apparatus according to claim 13, wherein said movable carriage comprises a carriage for supporting said baffle member attached thereto proximate to said channel and cooperatively formed ramp members positioned proximate to said carriage, said ramp members being attached to and spaced away from said partition to provide sufficient distance for movement of said baffle member and attached carriage thereon, said carriage means and attached baffle member move along said ramp members for moving said baffle member towards and away from said channel under the influence of air flowing through said channel created by a pressure differential.

17. A ventilation control apparatus according to claim 12, wherein said counterbalance comprises: a counterbalance weight attached to said movable baffle for counteracting the collective weight of said baffle member and carriage and the effect of the air moving through the inlet; means for attaching said counterbalance weight to said baffle member a distance away from said baffle member; and force directing means for directing a generally perpendicular force created by said counterbalance weight to create a parallel movement of said baffle member along said ramp.

18. A ventilation control apparatus according to claim 17, wherein said means for attaching said counterbalance weight to said baffle member is a cable and said force directing means is a pulley.

19. A ventilation control apparatus for use with a building ventilation system in a building; said building ventilation system including input and outlet vents and fan means for moving air therethrough, an opening formed in a ceiling of said building for introducing ventilating air flow into said building from said input vent through said opening and out through said outlet vent; said ventilation control apparatus comprising movable baffle for regulating air flow through said opening of said building, a ramp member positioned below said baffle means, a movable carriage attached to said baffle means movably positioned on said ramp member for operatively positioning said baffle means relative to said opening and baffle counterbalance means operatively attached to said movable baffle means and weighted for closing said movable baffle means relative to said opening when said fan means are not operating and for controllably regulating movement of said movable baffle means relative to said opening when said fan means are activated to create a pressure differential across said ventilation apparatus; said movable baffle means comprises a generally planar baffle member positioned generally parallel to said ceiling of said building and positioned covering said opening formed therethrough and said movable carriage attached to said generally planar baffle member for operatively positioning said baffle member relative to said top channel; said said movable carriage includes wheels supporting said carriage, said wheels of said carriage being cooperatively engageable with said ramp member being adjustably attached to and spaced away from said ceiling for adjusting the vertical position of said ramp member to provide sufficient distance for movement of said baffle member and attached carriage therealong, said carriage and attached baffle means being movable along said ramp members to move said baffle member towards and away from said opening under the influence of air flowing through said opening created by a pressure differential.

20. A ventilation control apparatus for use with a building ventilation system in a building; said building ventilation system including input and outlet vents and fan means for moving air therethrough and a channel formed in a partition of said building for introducing ventilating air flow into said building from said input vent through said opening and out through said outlet vent; said ventilation control apparatus comprising a movable baffle for regulating air flow through said channel of said building, a ramp member positioned below said baffle means, a movable carriage attached to said baffle means movably positioned on said ramp member for operatively positioning said baffle member relative to said opening and a baffle counterbalance operatively attached to said movable baffle and weighted for closing said movable baffle when said means for moving air are not operating and for controllably regulating movement of said movable baffle relative to said channel when said fan means is activated to create a pressure differential across the ventilation control apparatus which will equalize the distribution of air into the building; said movable baffle comprises a generally planar baffle member positioned generally parallel to said partition of said building and positioned covering said channel formed therethrough and said movable carriage attached to said generally planar baffle member for operatively positioning said baffle member relative to said channel; said movable carriage comprises a carriage for supporting said baffle member attached thereto proximate to said channel, said ramp member being cooperatively positioned proximate to said carriage, and attached to and spaced away from said partition to provide sufficient distance for movement of said baffle member and attached carriage thereon, said carriage means and attached baffle member move along said ramp members for moving said baffle member towards and away from said channel under the influence of air flowing through said opening created by a pressure differential, said ramp member being adjustably attached to said partition for adjusting the vertical position of said ramp.

21. A ventilation control apparatus for use with a building ventilation system in a building; said building ventilation system including input and outlet vents and fan means for moving air therethrough and a channel formed in a partition of said building for introducing ventilating air flow into said building from said input vent through said opening and out through said outlet vent; said ventilation control apparatus comprising a movable baffle for regulating air flow through said channel of said building, a ramp member positioned below said baffle means, a movable carriage attached to said baffle means movably positioned on said ramp member for operatively positioning said baffle member relative to said opening and a baffle counterbalance operatively attached to said movable baffle and weighted for closing said movable baffle when said means for moving air are not operating and for controllably regulating movement of said movable baffle relative to said channel when said fan means is activated to create a pressure differential across the ventilation control apparatus which will equalize the distribution of air into the building; said movable baffle includes a generally planar baffle member positioned generally parallel to said partition of said buildings and positioned covering said channel formed therethrough, said planar baffle member comprising a plurality of connected baffle sections, said baffle sections formed with at least two parallel generally rigid non-elastic side rail member and a panel member attached therebetween.

* * * * *

UNITED STATES PATENT AND TRADEMARK OFFICE
CERTIFICATE OF CORRECTION

PATENT NO. : 5,097,749
DATED : March 24, 1992
INVENTOR(S) : William M. Smith, Jr.

It is certified that error appears in the above-identified patent and that said Letters Patent is hereby corrected as shown below:

Column 10, line 51 (claim 20) "said opening created" should read
-- said channel created --

Column 10, line 68 (claim 21) "said opening and" should read
-- said channel and --

Signed and Sealed this

Sixth Day of July, 1993

Attest:

MICHAEL K. KIRK

Attesting Officer

Acting Commissioner of Patents and Trademarks